(12) United States Patent
Gao et al.

(10) Patent No.: US 9,976,668 B2
(45) Date of Patent: May 22, 2018

(54) VALVE CONFIGURED REGULATING THE FLOW OF FLUID BETWEEN A DEVICE, A HEATER, AND A COOLER

(71) Applicant: GM GLOBAL TECHNOLOGY OPERATIONS LLC, Detroit, MI (US)

(72) Inventors: Xiujie Gao, Troy, MI (US); Dongxu Li, Troy, MI (US); Nancy L. Johnson, Northville, MI (US); Ronald R. Semel, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 119 days.

(21) Appl. No.: 15/245,912

(22) Filed: Aug. 24, 2016

(65) Prior Publication Data

US 2017/0059054 A1 Mar. 2, 2017

Related U.S. Application Data

(60) Provisional application No. 62/210,784, filed on Aug. 27, 2015.

(51) Int. Cl.
| | |
|---|---|
| *F16K 17/38* | (2006.01) |
| *F16K 31/00* | (2006.01) |
| *F16K 11/07* | (2006.01) |
| *F16H 57/04* | (2010.01) |

(52) U.S. Cl.
CPC ....... *F16K 31/002* (2013.01); *F16H 57/0413* (2013.01); *F16K 11/07* (2013.01); *Y10T 137/7737* (2015.04); *Y10T 137/86517* (2015.04)

(58) Field of Classification Search
CPC .......... F16K 31/002; F16K 11/07; F16K 1/14; F16K 1/12; F16K 15/18; F16H 57/04; F03G 7/065
USPC ......... 137/468, 625.38, 625.13, 625.12, 625, 137/599.11; 251/11, 129.06
See application file for complete search history.

(56) References Cited

U.S. PATENT DOCUMENTS

| | | | | |
|---|---|---|---|---|
| 4,190,198 | A * | 2/1980 | Casuga ................... | F01M 5/007 236/34.5 |
| 5,791,557 | A * | 8/1998 | Kunze ................ | G05D 23/1333 236/34.5 |
| 6,253,837 | B1 * | 7/2001 | Seiler .................. | F16H 57/0413 137/625.29 |
| 7,540,431 | B2 * | 6/2009 | Kozdras ............. | G05D 23/1333 137/535 |

(Continued)

*Primary Examiner* — Umashankar Venkatesan
(74) *Attorney, Agent, or Firm* — Quinn IP Law

(57) ABSTRACT

A valve directs fluid flow received from a device to one of a heater and a cooler. The valve includes a spool movably disposed in the housing between a first, second, and third position. An actuator is in fluid communication with the fluid. The actuator includes a smart material that deactivates when the fluid temperature is no greater than a first temperature, partially activated when the fluid temperature is greater than the first temperature, and fully activated when the fluid temperature is at least equal to a second temperature. The spool moves to the first position when deactivated and fluid flows from the cavity, to the heater. The spool moves to the second position when partially activated to prevent fluid from flowing to each of the heater and the cooler. The spool moves to the third position when fully activated and fluid flows from the cavity, to the cooler.

20 Claims, 10 Drawing Sheets

(56) References Cited

U.S. PATENT DOCUMENTS

| | | | | |
|---|---|---|---|---|
| 8,083,209 B2* | 12/2011 | Kozdras | ............. | G05D 23/1333 |
| | | | | 165/297 |
| 8,123,143 B2* | 2/2012 | Willers | .............. | G05D 23/1333 |
| | | | | 236/101 A |
| 8,141,790 B2* | 3/2012 | Sheppard | .................. | F01P 7/16 |
| | | | | 236/100 |
| 8,960,562 B2* | 2/2015 | Neelakantan | ....... | F16H 57/0413 |
| | | | | 236/101 A |
| 8,991,719 B2* | 3/2015 | Sheppard | ............... | F01M 5/007 |
| | | | | 165/103 |
| 9,200,713 B2* | 12/2015 | Neelakantan | ............ | F16K 11/07 |
| 9,541,211 B2* | 1/2017 | Qiu | .................... | G05D 23/1333 |
| 2006/0076129 A1* | 4/2006 | Eliades | ................... | F28F 27/02 |
| | | | | 165/297 |
| 2009/0026405 A1* | 1/2009 | Sheppard | ............... | F16K 15/06 |
| | | | | 251/364 |
| 2012/0161042 A1* | 6/2012 | Sheppard | ............... | F01M 5/007 |
| | | | | 251/11 |
| 2015/0277453 A1* | 10/2015 | Yajima | .................. | F16K 31/002 |
| | | | | 236/93 R |

* cited by examiner

VALVE CONFIGURED REGULATING THE FLOW OF FLUID BETWEEN A DEVICE, A HEATER, AND A COOLER

CROSS-REFERENCE TO RELATED APPLICATIONS

This application claims the benefit of U.S. Provisional Application No. 62/210,784, filed on Aug. 27, 2015, which is hereby incorporated by reference in its entirety.

TECHNICAL FIELD

The disclosure relates to a valve configured for regulating the flow of fluid between a device and a heater and a cooler.

BACKGROUND

To operate properly, a transmission for a vehicle or non-automotive application, such as an HVAC system, requires a supply of fluid, such as conventional transmission oil. The fluid may be used for such functions as cooling and lubrication. The lubricating and cooling capabilities of transmission oil systems greatly impact the reliability and durability of the transmission. Additionally, multi-speed power transmissions require fluid for controlled engagement and disengagement, on a desired schedule, of the various torque transmitting mechanisms that operate to establish the speed ratios within the internal gear arrangement.

SUMMARY

A fluid circuit is configured for regulating the flow of a fluid. The fluid circuit includes a device, a heater, a cooler, and a valve. The device is configured for receiving and expelling the fluid, as a function of a temperature of the fluid. The heater is configured for receiving, heating, and expelling the fluid to the device. The cooler is configured for receiving, cooling, and expelling the fluid to the device. The valve is configured for directing the flow of fluid received from the device to one of the heater and the cooler, as a function of the temperature of the fluid.

The valve includes a housing, a spool, and an actuator. The housing defines a cavity extending longitudinally between a first end and a second end. The cavity is configured for receiving and expelling the fluid. The spool is disposed in the cavity and is movable longitudinally therein between a first position, a second position, and a third position.

The actuator is operatively disposed within the cavity and is configured to be in continuous fluid communication with the fluid received from the device. The actuator includes a smart material that is configured to be deactivated in response to the temperature of the fluid being no greater than a first temperature, such that the smart material deactivates the actuator. The smart material is configured to be fully activated in response to the temperature of the fluid being at least equal to a second temperature, such that full activation of the smart material causes the actuator to be fully activated. The smart material is also configured to be partially activated in response to the temperature of the fluid being greater than the first temperature and less than the second temperature, such that the smart material causes the actuator to be partially activated.

The actuator is configured to continuously act on the spool when the actuator is partially activated, such that the spool moves to the second position. The actuator is configured to continuously act on the spool when the actuator is fully activated, such that the spool moves to the third position. The fluid is permitted to flow from the cavity to the heater, and from the heater to the device when the spool is in the first position. The fluid is prevented from flowing to the heater and the cooler when the spool is in the second position. The fluid is also permitted to flow from the cavity to the cooler, and from the cooler to the device when the spool is in the third position.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
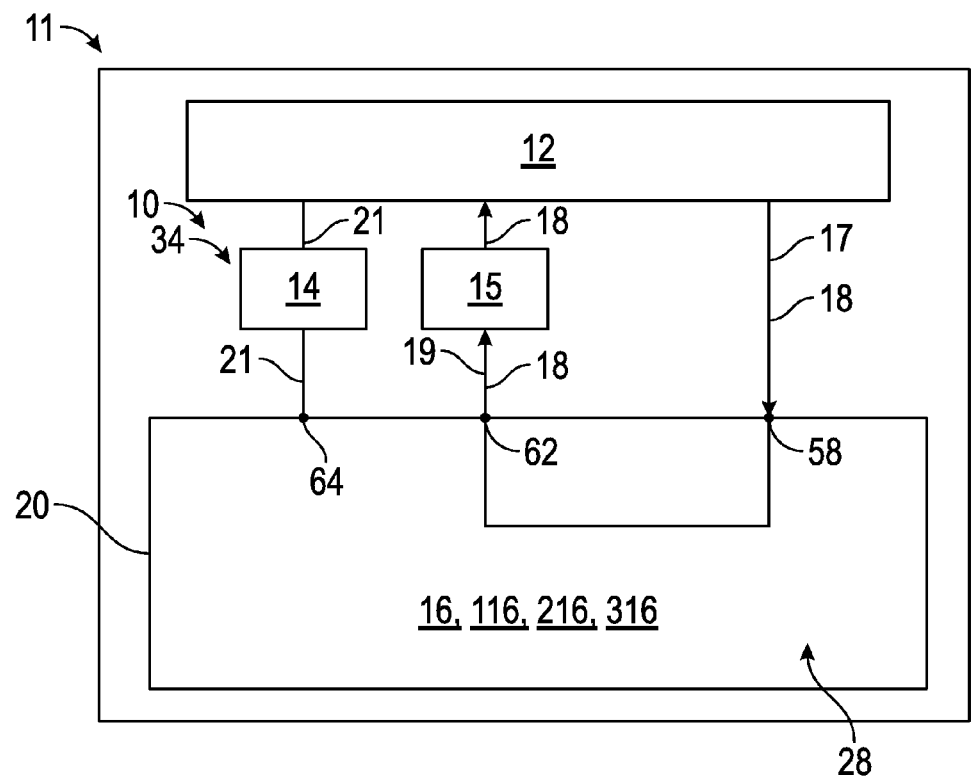
FIG. 1 is a schematic diagram of a device fluid circuit of a vehicle having a device, a cooler, a heater, and a valve in a first position such that fluid flows from the device, to the valve, from the valve to the heater, and from the heater to the device.
Figure 2:
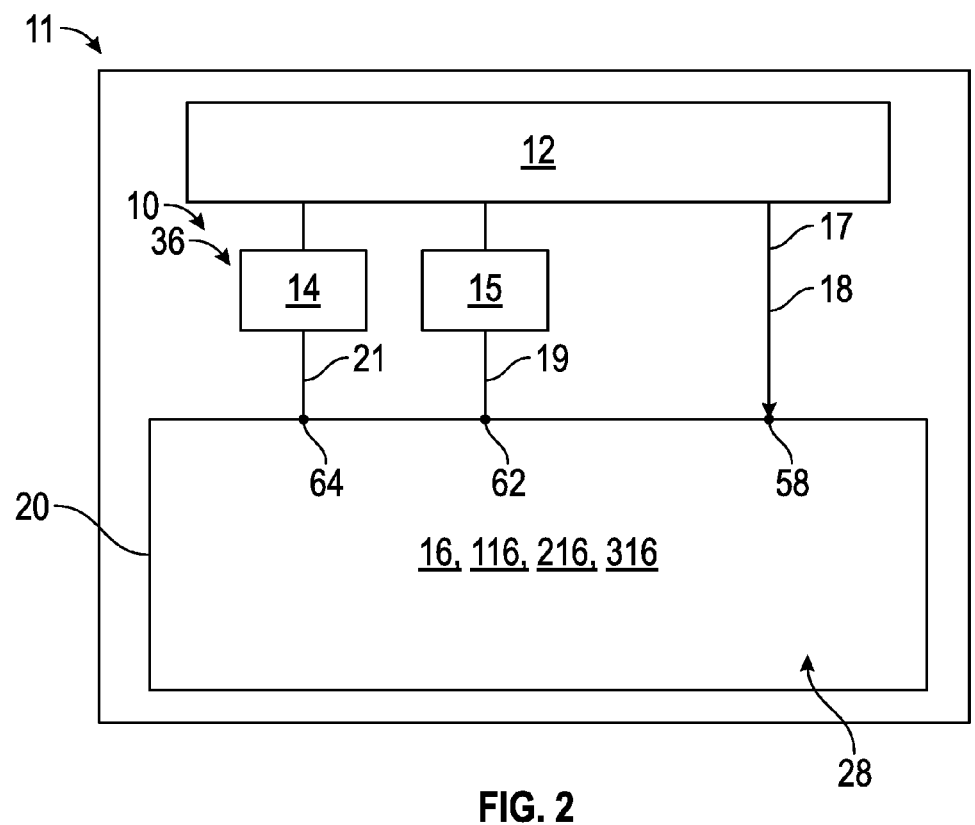
FIG. 2 a schematic diagram of the fluid circuit with the valve in a second position such that fluid flows from the device to the valve and the valve restricts fluid from flowing therethrough, back to the device.
Figure 3:
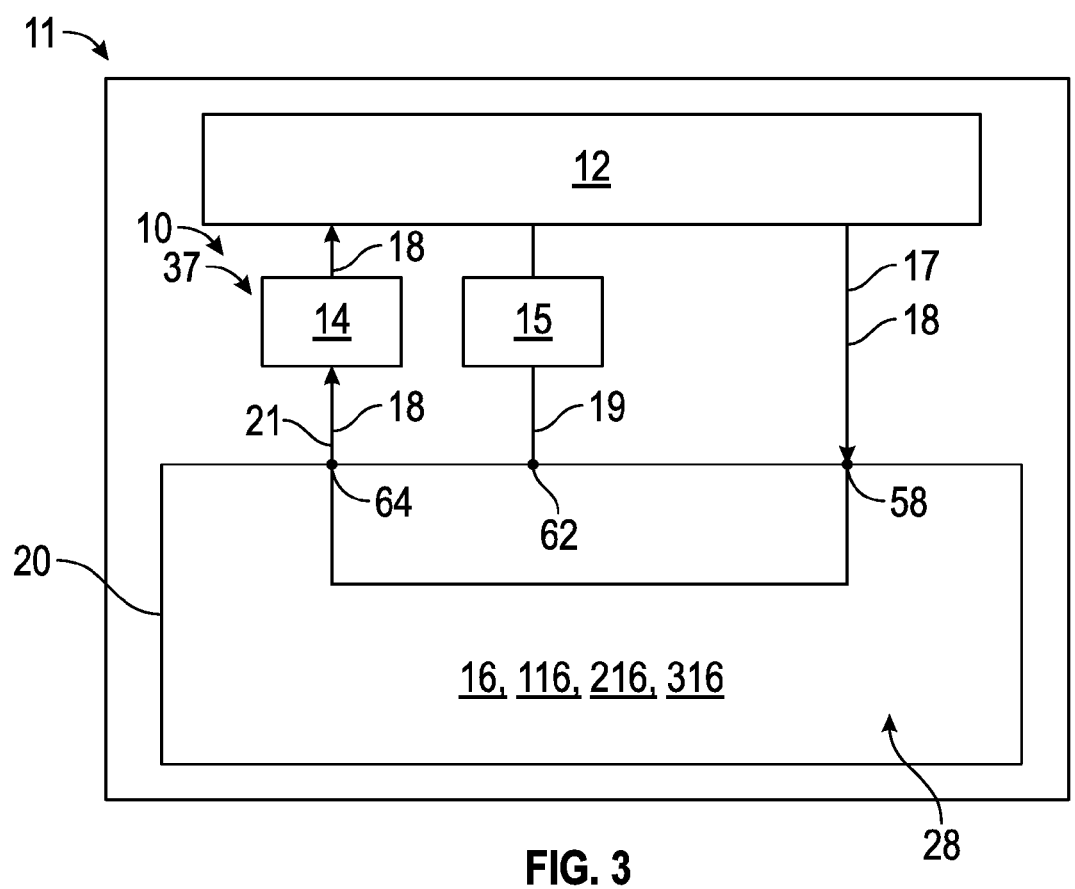
FIG. 3 is a schematic diagram of the fluid circuit with the valve in a third position such that the fluid flows from the device, to the valve, from the valve to the cooler, and from the cooler to the device.

Referring to the Figures, wherein like reference numerals refer to like elements, a fluid circuit is shown generally at 10 in FIGS. 1-3. The transmission fluid circuit 10 includes a device 12, a cooler 14, a heater 15, and a valve 16. As will be explained in more detail below, the valve 16 is configured for regulating the circulation of a fluid 18 between the device 12, the cooler 14, and the heater 15. The device 12 may be a transmission, such as an automatic transmission for a vehicle 11 which is configured for receiving and expelling the fluid 18. The fluid 18 may be an automatic transmission fluid (ATF) and the like. Furthermore, the device 12 may be incorporated in applications other than vehicles. For example, the device 12 may be incorporated into HVAC systems of buildings, boats, aircraft, appliances, and the like.

The fluid 18 present in the device 12 has a viscosity that changes as a function of temperature. In cold temperatures, the viscosity may be high, resulting in parasitic losses and reduced fuel economy, until the fluid 18 is not greater than a desired operating temperature. With reference to FIG. 1, when the fluid is less than the desired operating temperature, the valve 16 is in the first position 34 such that the valve 16 directs the flow of the fluid 18 from the device 12 to the heater 15, and from the heater 15 the device. The heater 15 heats the fluid 18 to the desired operating temperature and directs the heated fluid 18 toward the device 12. The heater 15 may be a heat exchanger, an electric heater, an oil-to-engine coolant heat exchanger, and the like.

The cooler 14 may be an automatic device fluid cooler 14 and the like. With reference to FIG. 3, the valve 16 is in the third position 37 such that the cooler 14 receives the fluid 18 from the valve 16, cools the fluid 18, and expels the cooled fluid 18, which eventually flows back to the device 12. It should be appreciated that for simplicity the Figures illustrate the fluid 18 flowing directly to the device 12 after exiting the heater 15 or the cooler 14. However, those of skill in the art will recognize that the fluid 18 may flow through other components before returning to the device 12.

With reference between FIGS. 1-3, the valve 16, 116, 216, 316 is movable between three positions, i.e., a first position 34, a second position 36, and a third position 37. In order to heat the fluid 18 of the device 12 during operation, the valve 16, 116, 216, 316 is in the first position 34 and is configured to direct the flow of the fluid 18 from the device 12 to the heater 15 and from the heater 15 to the device 12 when the fluid 18 being expelled from the device 12 is not greater than a first temperature (FIG. 1). However, when the fluid 18 being expelled from the device 12 is at an intermediate temperature that is greater than the first temperature, but less than a second temperature, the valve 16, 116, 216, 316 is in the second position 36 and may prevent or restrict the fluid 18 being expelled from the valve 16, 116, 216, 316, to the device (FIG. 2). Also, in order to cool the fluid 18 of the device 12 during operation, when the fluid 18 being expelled from the device 12 is at least equal to the second temperature, the valve 16, 116, 216, 316 is in the third position 37 and is configured to direct the flow of fluid 18 from the device 12 to the cooler 14 and from the cooler 14 to the device 12 (FIG. 3). Therefore, the heater 15 only operates when the fluid 18 is not greater than the first temperature, and the cooler 14 only operates when the fluid 18 is at least equal to the second temperature, resulting in vehicle energy savings by preventing unnecessary operation of the heater 15 or the cooler 14 at temperatures greater than the first fluid temperature and less than the second fluid temperature. By way of a non-limiting example, the first temperature may be 90 degrees Celsius (° C.) and the second temperature may be 105° C. It should be appreciated that the valve may be configured to move between positions in response to other temperatures, as well.

Referring generally to embodiments shown in FIGS. 4-15, the respective valves 16, 116, 216, 316 each include a housing 20, a spool 22, an actuator 24, and a biasing device 26. The housing 20 defines a cavity 28 which extends longitudinally between a first end 30 and a second end 32. The cavity 28 is configured for receiving and expelling the fluid 18. The spool 22 is disposed in the cavity 28 and is movable longitudinally therein between the first position 34 (FIGS. 4, 7, 10, 13), the second position 36 (FIGS. 5, 8, 11, 14), and the third position 37 (FIGS. 6, 9, 12, 15). The fluid 18 is permitted to flow from the device 12 to the cavity 28, from the cavity 28 to the heater 15, and from the heater 15 to the device 12 when the spool 22 is in the first position 34. Referring again to FIGS. 5, 8, 11, 14, the fluid 18 is permitted to flow from the device 12 to the cavity 28, where the spool 22 may restrict or block or otherwise prevent the fluid 18 from exiting the valve 16 when the spool 22 is in the second position 36. Finally, referring again to FIGS. 6, 9, 12, 15, the fluid 18 is permitted to flow from the device 12 to the cavity 28, from the cavity 28 to the cooler 14, and from the cooler 14 to the device 12 when the spool 22 is in the third position 37.

Referring again to FIGS. 1-3, a first fluid passage 17 is disposed between, and in fluid communication with, the housing 20 of the valve 16, 116, 216, 316 and the device 12. A second fluid passage 19 is disposed between, and in fluid communication with, the housing 20 of the valve 16, 116, 216. 316 and the device 12, with the heater 15 disposed in fluid communication with the second fluid passage 19. A third fluid passage 21 is disposed between, and in fluid communication with, the housing 20 and the device 12, with the cooler 14 disposed in fluid communication with the third fluid passage 21. The housing 20 defines a first inlet 58, a first outlet 62, and a second outlet 64, that are each in fluid communication with the cavity 28. Therefore, the first inlet 58 is in fluid communication with the first fluid passage 17, the first outlet 62 is in fluid communication with the second fluid passage 19, and the second outlet 64 is in fluid communication with the third fluid passage 21.

Referring generally to FIGS. 4-15, the actuator 24 is disposed within the cavity 28 to be in fluid communication with the fluid 18. The actuator 24 includes a smart material 40, which may be a shape memory alloy (SMA) material which is configured to be deactivated, i.e. to be in a first state, in response to the fluid 18 in the cavity 28 being not greater than the first temperature, such that the SMA material 40 does not activate the actuator 24 and the valve 16, 116, 216, 316 is in the first position 34 (FIGS. 4, 7, 10, 13). Further, the SMA material 40 is configured to be partially activated, i.e., to be in a second state, in response to the fluid 18 in the cavity 28 having greater than the first temperature and less than the second temperature, such that the SMA material 40 partially activates and the valve 16, 116, 216, 316 is in the second position 36 (FIGS. 5, 8, 11, 14). Additionally, the SMA material 40 is configured to be fully activated, i.e., to be in a third state, in response to the fluid 18 in the cavity 28 having at least the second temperature such that activation of the SMA material 40 activates the actuator 24 and the valve 16, 116, 216, 316 is in the third position (FIGS. 6, 9, 12, 15). The SMA material 40 exhibits a temperature hysteresis in its phase transformations. The magnitude of the hysteresis is typically between five degrees and forty degrees Celsius (C). The specific magnitude of the hysteresis in a particular application is a function of several parameters, including the material formulation of the SMA material 40 and the stress state of the SMA material 40.

The SMA material 40 has a crystallographic phase changeable between austenite and martensite in response to exposure to a temperature of at least the first temperature and a temperature below the second temperature, which is typically higher than the first temperature. As used herein, the terminology SMA refers to alloys which exhibit a shape memory effect. That is, the SMA material 40 may undergo a solid state phase change via atomic rearrangement to shift between a martensite phase, i.e., "martensite", and an austenite phase, i.e., "austenite". Stated differently, the SMA material 40 may undergo a displacive transformation rather than a diffusional transformation to shift between martensite and austenite. A displacive transformation is when a structural change occurs by the coordinated movement of atoms (or groups of atoms) relative to their neighbors. In general, the martensite phase refers to the comparatively lower-temperature phase and is often more deformable than the comparatively higher-temperature austenite phase. The temperature at which the shape memory alloy material begins to change from the austenite phase to the martensite phase is known as the martensite start temperature, $M_s$. The temperature at which the SMA material 40 completes the change from the austenite phase to the martensite phase is known as the martensite finish temperature, $M_f$. Similarly, as the SMA material 40 is heated, the temperature at which the SMA material 40 begins to change from the martensite phase to the austenite phase is known as the austenite start temperature, $A_s$. The temperature at which the SMA material 40 completes the change from the martensite phase to the austenite phase is known as the austenite finish temperature, $A_f$.

The SMA material 40 may be characterized by a cold state, i.e., when a temperature of the SMA material 40 is below the martensite finish temperature $M_f$ of the SMA material 40. Likewise, the SMA material 40 may also be characterized by a hot state, i.e., when the temperature of the SMA material 40 is above the austenite finish temperature $A_f$ of the SMA material 40.

In operation, SMA material 40 that is pre-strained or subjected to tensile stress can change dimension upon changing crystallographic phase to thereby convert thermal energy to mechanical energy. That is, the SMA material 40 may change crystallographic phase from martensite to austenite and thereby dimensionally contract if pseudoplastically pre-strained so as to convert thermal energy to mechanical energy. Conversely, the SMA material 40 may change crystallographic phase from austenite to martensite and if under stress thereby dimensionally expand.

"Pseudoplastically pre-strained" refers to stretching the SMA material 40 while in the martensite phase so that the strain exhibited by the SMA material 40 under that loading condition is not fully recovered when unloaded, where purely elastic strain would be fully recovered. In the case of SMA material 40, it is possible to load the material such that the elastic strain limit is surpassed and deformation takes place in the martensitic crystal structure of the material prior to exceeding the true plastic strain limit of the SMA material 40. Strain of this type, between those two limits, is pseudoplastic strain, called such because upon unloading it appears to have plastically deformed, but when heated to the point that the SMA material 40 transforms to its austenite phase, that strain can be recovered, returning the SMA material 40 to the original length observed prior to being subjected to any applied loading.

The SMA material 40 may have any suitable composition. In particular, the SMA material 40 may include an element selected from the group including cobalt, nickel, titanium, indium, manganese, iron, palladium, zinc, copper, silver, gold, cadmium, tin, silicon, platinum, gallium, and combinations thereof. For example, suitable SMA materials 40 may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations thereof. The SMA material 40 can be binary, ternary, or any higher order so long as the SMA material 40 exhibits a shape memory effect, e.g., a change in shape orientation, damping capacity, and the like.

In the embodiments shown in FIGS. 4-6 and 10-15, the SMA material 40 longitudinally expands when activated. Likewise, in the embodiment shown in FIGS. 7-9, the SMA material 40 longitudinally contracts when activated.

The actuator 24 is activated by the temperature of the fluid 18 being greater than the first temperature. When the actuator 24 is activated, the actuator 24 acts on the spool 22 to move the spool 22 from the first position 34, shown in FIGS. 4, 7, 10, 13, to the second position 36, shown in FIGS. 5, 8, 11, 14. As the temperature of the fluid 18 increases to be at least equal to the second temperature, the actuator 24 continues to act on the spool 22 to move the spool 22 from the second position 36 shown in FIGS. 5, 8, 11, 14, to the third position 37, shown in FIGS. 6, 9, 12, 15. The fluid 18 is permitted to flow from the device 12 to the cavity 28 of the valve 16, 116, 216, 316, from the cavity 28 to the heater 15, and from the heater 15 to the device 12 when the spool 22 is in the first position 34. The fluid 18 is permitted to flow from the device 12 to the cavity 28 of the valve 16, 116, 216, 316, where the spool 22 restricts or prevents the fluid 18 from exiting the valve 16, 116, 216, 316 through first or second outlet 62, 64 when the spool 22 is in the second position 36. Likewise, the fluid 18 is permitted to flow from the device 12 to the cavity 28, from the cavity 28 to the cooler 14, and from the cooler 14 back to the device 12 when the spool 22 is in the third position 37, shown in FIGS. 6, 9, 12, 15.

Figure 4:
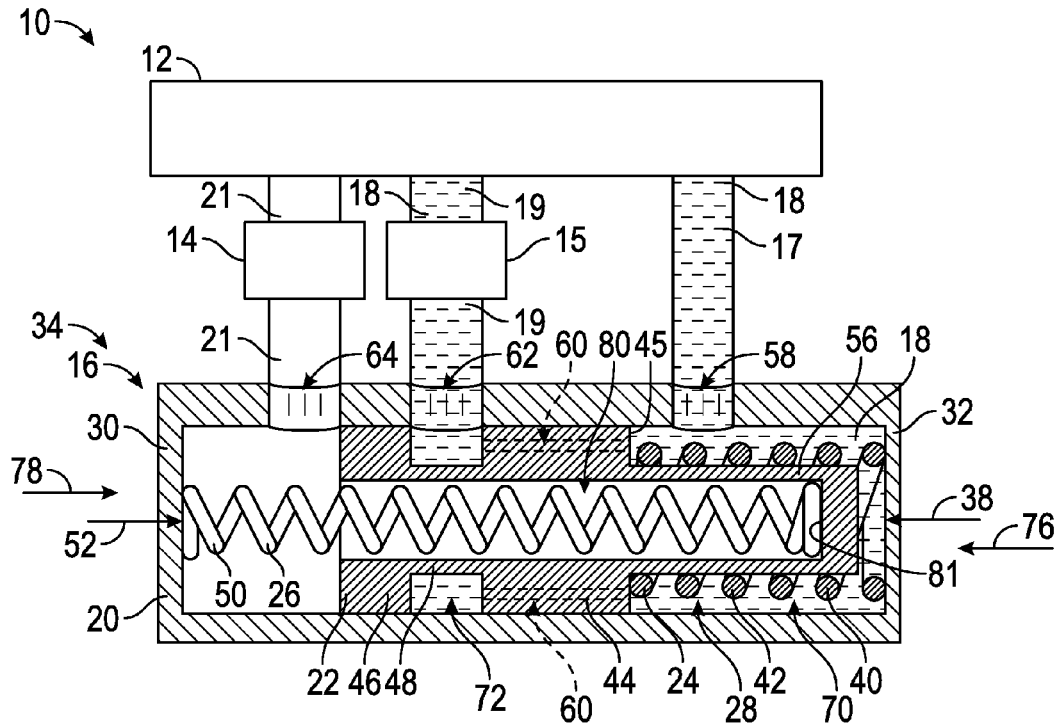
FIG. 4 is a schematic cross-sectional view of a first embodiment of the valve in the fluid circuit, with the valve, shown in the first position.
Figure 5:
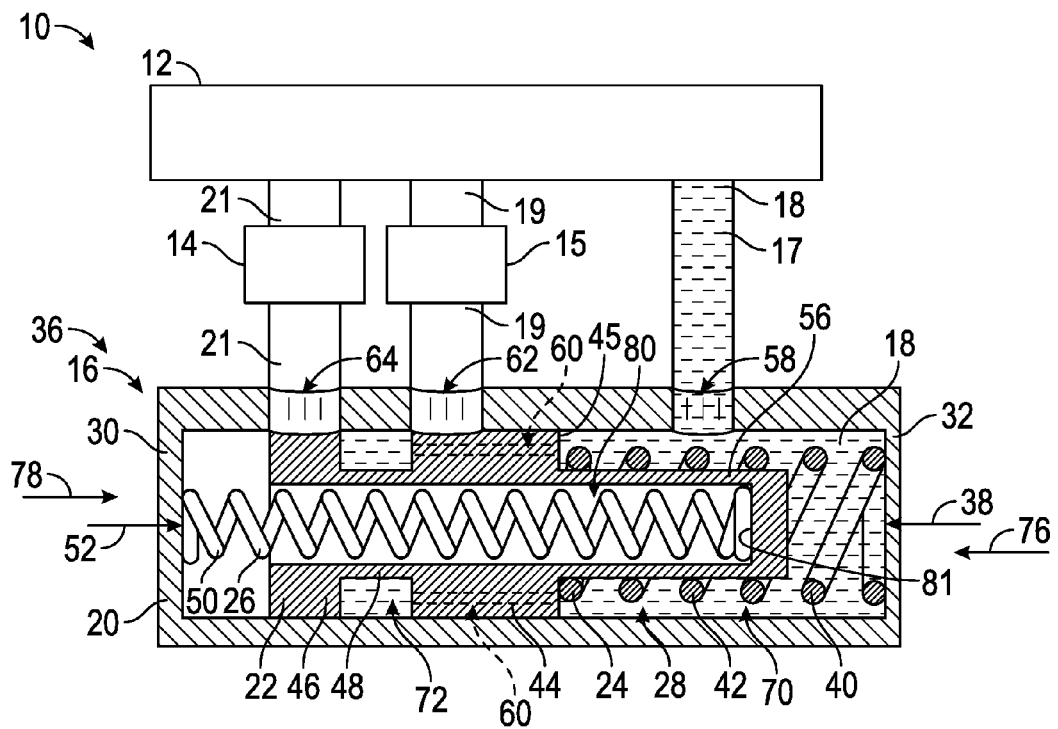
FIG. 5 is a schematic cross-sectional view of the valve of FIG. 4 in the fluid circuit, shown in the second position.
Figure 6:
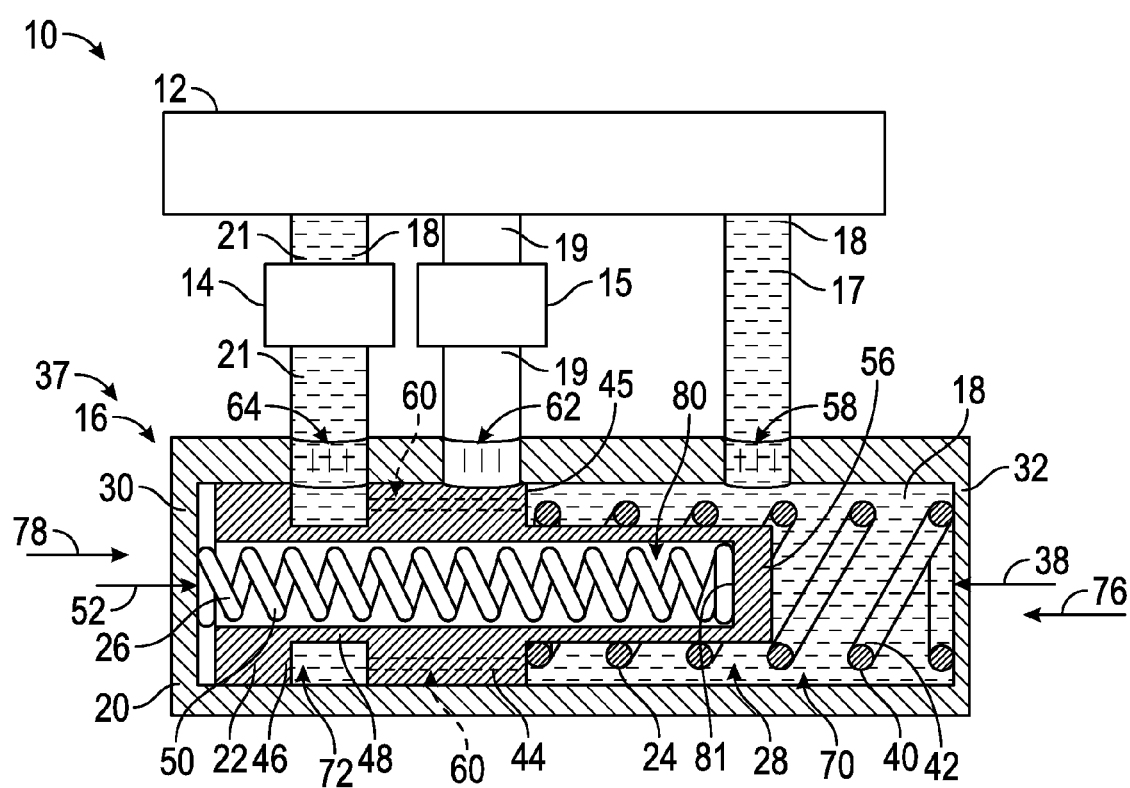
FIG. 6 is a schematic cross-sectional view of the valve of FIG. 4 in the fluid circuit, shown in the third position.

Referring specifically to the embodiment of the valve 16 shown in FIGS. 4-6, the actuator 24 is a coil spring 42 that includes the SMA material 40. The spool 22 is disposed in the cavity 28 and is movable longitudinally therein between the first position 34 (FIG. 4), the second position 36 (FIG. 5), and the third position 37 (FIG. 6). The coil spring 42 is operatively disposed within the cavity 28, between the second end 32 of the housing 20 and the spool 22, and is configured to act on the spool 22. The spool 22 includes a first section 44, a second section 46, a leading section 48, and a trailing section 56. The first section 44 is longitudinally spaced from the second section 46. The leading section 48 functions as an intermediate section to connect the first section 44 to the second section 46. The first section 44 and the second section 46 are radially sized to fit within the cavity 28 such that the fluid 18 is prevented from passing within the cavity 28 between the first section 44 or the second section 46 and the housing 20. The leading section 48 is radially sized to be smaller than the first section 44 and second section 46 such that the fluid 18 is allowed to flow radially about the leading section 48, between the leading section 48, the first section 44, the second section 46, and the housing 20. The trailing section 56 extends from the first section 46, opposite the leading section 48, such that the first section 46 is longitudinally disposed therebetween. The trailing section 56 is radially sized to be smaller than the first section 44. The coil spring 42 actuator 24 is operatively disposed in the cavity 28 between the first section 44, opposite the leading section 48, and the housing 20. The coil spring 42 is coiled about the trailing section 56 such that the coil spring 42 acts on a first wall 45 of the first section 44. The coil spring 42 is configured to act on the first section 44 and apply a first force 38 in a first longitudinal direction 76.

The biasing device 26 is operatively disposed in the cavity 28 and configured to act on the spool 22 in a second longitudinal direction 78, opposite the first force 38 applied in the first longitudinal direction 76. More specifically, the biasing device 26 is operatively disposed to react between the spool 22 and the first end 30 of the housing 20. The spool 22 may define a recess 80 that opens from the second section 46 and extends through the section 46, the leading section 48, and the first section 44, and into a trailing section 56, where the recess 80 terminates at an end wall 81. The biasing device 26 may be operatively disposed within the recess 80 to react between the end wall 81 of the spool 22 and the first end 30 of the housing 20 and apply a second force 52 to the spool 22 in the second longitudinal direction 78, opposite the first longitudinal direction 76 of the first force 38 applied by the actuator 24. The biasing device 26 may be a compression spring 50. Recessing the biasing device 26 within the recess 80 allows for a valve 16 that is compact in size, without sacrificing a desired amount of travel of the spool 22 within the cavity 28. The end wall 81 faces longitudinally opposite the direction of the first wall 45.

With continued reference to FIGS. 4-6, the spool 22 divides the cavity 28 into a first portion 70 and a second portion 72. The first portion 70 is defined between the first section 44, the trailing section 56, and the housing 20. The second portion 72 is defined between the first section 44, the second section 46, the leading section 48, and the housing 20. The first section 44 of the spool 22 defines a plurality of vent holes 60 that open between the first portion 70 and the second portion 72 of the cavity 28 to provide fluid communication between the first portion 70 and the second portion 72. Therefore, vent holes 60 allow the fluid 18 within the first portion 70 of the cavity 28 to flow therethrough, into the second portion 72 of the cavity 28.

The first inlet 58 the housing 20 of the valve 16 provides fluid communication from the device 12 through the first fluid passage 17, into the first portion 70 of the cavity 28, regardless of the position of the spool 22. The first outlet 62 provides fluid communication from the second portion 72 of the cavity 28 to the second fluid passage 19, and, thus, the heater 15, when the spool 22 is in the first position 34 (FIG. 4). The second outlet 64 provides fluid communication from the second portion 72 of the cavity 28 to the third fluid passage 21, and, thus, the cooler 14, when the spool 22 is in the third position 37 (FIG. 6).

Further, when the spool 22 is in the second position 36 (FIG. 5) the first section 44 of the spool 22 blocks the first outlet 62 and the second section 46 of the spool 22 blocks the second outlet 64. Thus, fluid 18 is restricted or prevented from exiting the valve 16 when the spool 22 is in the second position 36, and fluid 18 does not flow through the heater 15 or the cooler 14.

With continued reference to FIGS. 4-6, the coil spring 42 actuator 24 is disposed in the first portion 70 of the cavity 28 and is also in fluid communication with the fluid 18 disposed in the first portion 70 of the cavity 28.

Referring specifically to FIG. 4, the temperature of the fluid 18 is not greater than the first temperature, and the SMA material 40 of the coil spring 42 is deactivated, such that the coil spring 42 is longitudinally contracted. As such, the contracted coil spring 42 acts on the first section 44 of the spool 22 in the first longitudinal direction 76 with a first force 38, while the biasing device 26 acts on the end wall 81 of the trailing section 56 of the spool 22 in a second longitudinal direction 78, opposite the first longitudinal direction 76, with a second force 52, which is greater than the first force 38 of the coil spring 42, to maintain the spool 22 in the first position 34. In the first position 34, the fluid 18 sequentially flows through the first inlet 58, and into the first portion 70 of the cavity 28, through the vent holes 60, and into the second portion 72 of the cavity 28. The fluid 18 then exits the second portion 72 of the cavity 28 by flowing through the first outlet 62 through the first outlet 62, into the second fluid passage 19, to enter the heater 15. The fluid 18 then flows out of the heater 15 and enters the device 12. It should be appreciated that, in the first position 34, the fluid 18 is prevented from flowing from the cavity 28 and into the fluid cooler 14. Additionally, the actuator 24, including the SMA material 40, is totally immersed in the flowing fluid 18 such that the temperature is even across the whole actuator 24 and is always equal to the temperature of the fluid 18 flowing from the device 12.

Referring now to FIG. 5, the fluid 18 is at a temperature that is greater than the first temperature, but less than the second temperature, such that the coil spring 42 is partially activated. As such, the coil spring 42 partially longitudinally expands, increasing the magnitude of the first force 38 applied to the first wall 45 of the spool 22, such that the first force 38 is greater than the second force 52 of the biasing device 26. The coil spring 42 acts on the wall 45 of the first section 44 of the spool 22 in the first longitudinal direction 76 with the first force 38 while the biasing device 26 acts on the end wall 81 of the spool 22 with the second force 52, which is less than the first force 38 of the coil spring 42. As a result of the force imbalance, the spool 22 moves in the first longitudinal direction 76 to the second position 36, where the first outlet 62 is blocked by the first section 44 and second outlet 64 is blocked by the second section 46 of the spool 22. Thus, fluid 18 is prevented from exiting the cavity through either outlet 62, 64.

Referring now to FIG. 6, the fluid 18 is at a temperature that is at least equal to the second temperature, such that the coil spring 42 is fully activated. As such, the coil spring 42 longitudinally expands even further to increase the magnitude of the first force 38 applied to the first wall 45 of the spool 22 in the first longitudinal direction 76. Therefore, the first force 38 is greater than the second force 52 of the biasing device 26 and, thus, moves the spool 22 even further in the first longitudinal direction 76 to the third position 37. In the third position 37, the fluid 18 flows out of the second portion 72 of the cavity 28, through the second outlet 64, and enters the third fluid passage 21 and the cooler 14, which cools the fluid 18. The cooled fluid 18 then exits the cooler 14 and eventually enters the device 12. When the spool 22 is in the third position 37, the first section 44 blocks the first outlet 62 such that the fluid 18 is prevented from exiting the cavity 28 through the first outlet 62.

Figure 7:
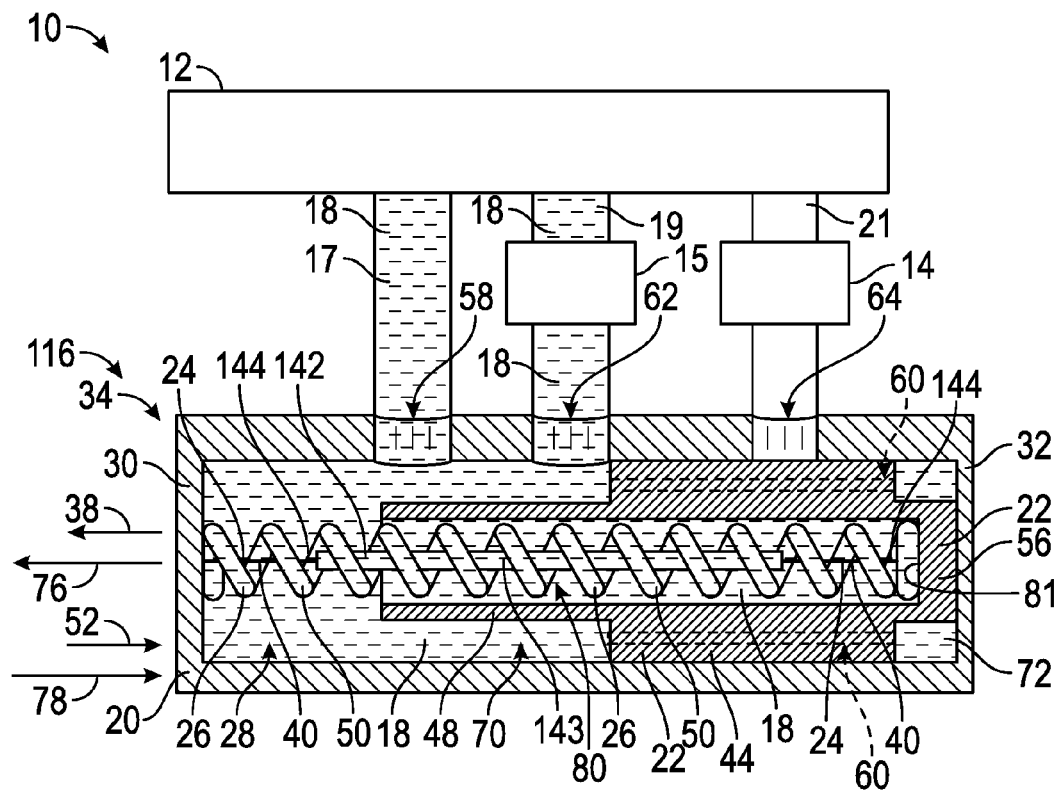
FIG. 7 is a schematic cross-sectional view of a second embodiment of the valve in the fluid circuit, with the valve shown in the first position.
Figure 8:
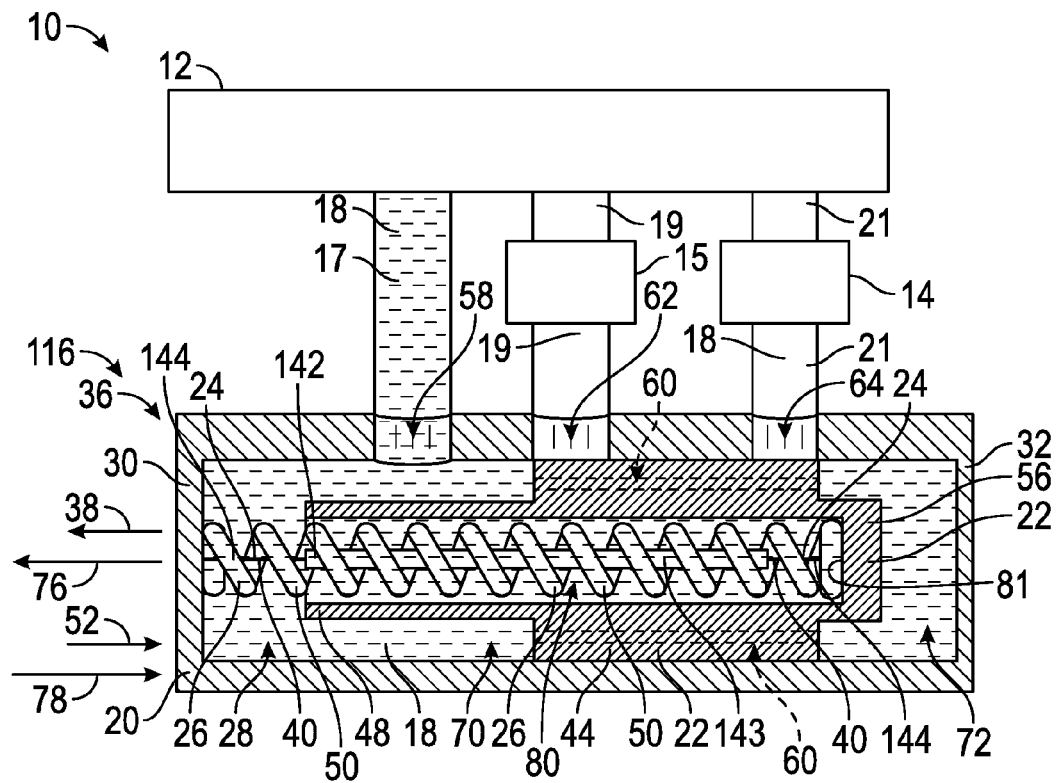
FIG. 8 is a schematic cross-sectional view of the valve of FIG. 7 in the fluid circuit, shown in the second position.
Figure 9:
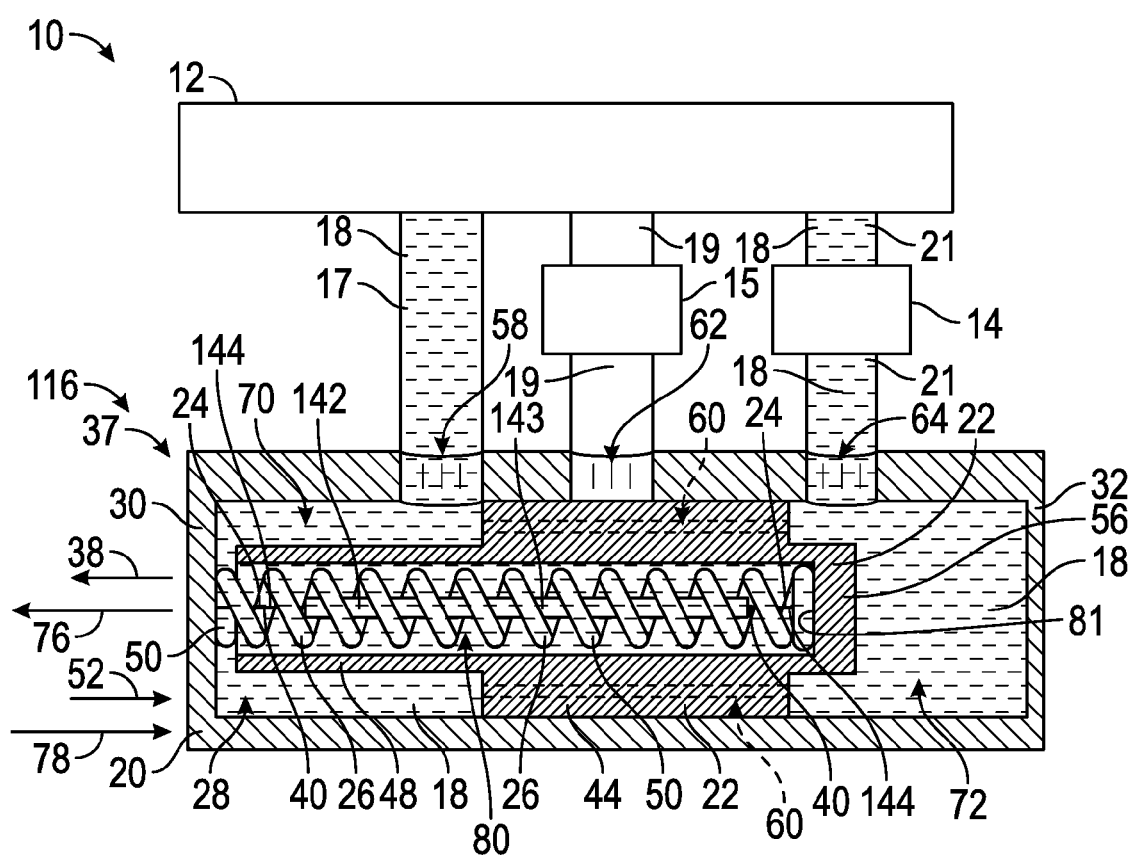
FIG. 9 is a schematic cross-sectional view of the valve of FIG. 7 in the fluid circuit, shown in the third position.

Referring now to FIGS. 7-9, another embodiment of the valve 116 is shown in the first position 34 (FIG. 7), the second position 36 (FIG. 8), and the third position 37 (FIG. 9).

The actuator 24 may be a rod assembly 142, i.e., an end link actuator that includes a rod 143 and a pair of wires 144 operatively extending from opposing ends of the rod 143. Therefore, these are discrete wires 144, where one of the wires 144 is attached to an end of the rod 143 and the other wire 144 is attached to the opposite end of the rod 143. The wires 144 include the SMA material 40. The spool 22 is disposed in the cavity 28 and is movable longitudinally therein between the first position 34 (FIG. 7), the second position 36 (FIG. 8), and the third position 37 (FIG. 9). The rod assembly 142 is operatively disposed within the cavity 28, between the first end 30 of the housing 20 and the spool 22, and is configured to act on the spool 22.

With continued reference to FIGS. 7-9, the spool 22 includes a first section 44, a leading section 48, and a trailing section 56. The leading section 48 and the trailing section 56 longitudinally extend from the first section 44, opposite one another. The first section 44 is radially sized to fit within the cavity 28 such that the fluid 18 is prevented from passing within the cavity 28 between the first section 44 and the housing 20. The leading and trailing sections 48, 56 are radially sized radially sized to be smaller than the first section 44 such that the fluid 18 is allowed to flow radially about the leading and trailing sections 48, 56.

The spool 22 defines a recess 80 that opens from the leading section 48 and extends to an end wall 81. The rod assembly 142 is partially operatively disposed within the recess 80, and one of the wires 144 is operatively attached to the end wall 81 of the spool 22 within the recess 80 and the other one of the wires 144 is operatively attached to the housing 20, at the first end 30. The rod assembly 142 is configured to act on the spool 22 and the housing 20 and apply the first force 38 in a first longitudinal direction 76, i.e., pulls the spool 22 toward the first end 30, when the SMA material 40 is activated, e.g., partially or fully.

The biasing device 26 is operatively disposed in the recess 80, between the first end 30 and the spool 22. The biasing device 26 may be a compression spring 50 and surrounds the rod assembly 142, such that the biasing device is operatively disposed to react between the end wall 81 of the spool 22 and the first end 30 of the housing 20. The biasing device 26 is configured to act on the spool 22, in the second longitudinal direction 78, opposite the first longitudinal direction 76.

With continued reference to FIGS. 7-9, the spool 22 divides the cavity 28 into a first portion 70 and a second portion 72. The first portion 70 is defined between the first section 44, the leading section 48, and the housing 20. The second portion 72 is defined between the first section 44, the trailing section 56, and the housing 20, opposite the first portion 70. The first section 44 of the spool 22 defines a plurality of vent holes 60 that open between the first portion 70 and the second portion 72 of the cavity 28 to provide fluid communication within the cavity 28, between the first portion 70 and the second portion 72. Therefore, fluid 18 within the first portion 70 of the cavity 28 flows through the vent holes 60, into the second portion 72 of the cavity 28.

The first inlet 58 provides fluid communication from the first fluid passage 17 to the first portion 70 of the cavity 28, regardless of the position of the spool 22. The spool 22 is operatively configured such that the first outlet 62 provides fluid communication from the first portion 70 of the cavity 28 to the second fluid passage 19, and subsequently, the heater 15, when the spool 22 is in the first position 34 (FIG. 7). The spool 22 is also operatively configured such that the second outlet 64 provides fluid communication from the second portion 72 of the cavity 28 to the third fluid passage 21, when the spool 22 is in the third position 37 (FIG. 9). However, when the spool 22 is in the second position 36, shown in FIG. 8, the first section 44 of the spool 22 blocks the first outlet 62 and the second outlet 64. Thus, fluid 18 is prevented from exiting the valve 116 through these outlets 62, 64 when the spool 22 is in the second position 36.

Referring specifically to FIG. 7, when the valve 116 is in the first position 34, the fluid 18 is at a temperature that is not greater than the first temperature, and the rod assembly 142 is deactivated, such that the pair of wires 144 are longitudinally extended. Thus, the extended wires 144 do not act between the spool 22 and the first end 30 of the housing 20 in the first longitudinal direction 76, such that the rod assembly 142 does not apply a first force 38 in the first longitudinal direction 76, while the biasing device 26 is reacting between the first end 30 and the spool 22 in the second longitudinal direction 78, opposite the first longitudinal direction 76, with a second force 52 to maintain the spool 22 in the first position 34. In the first position 34, the fluid 18 flows into the first portion 70 of the cavity 28, such that the SMA material 40 of the actuator wires 144 are continuously immersed in the fluid 18. The first section 44 blocks the second outlet 64, while the fluid 18 then exits the first portion 70 of the cavity 28 through the first outlet 62, and into the second fluid passage 19. The fluid 18 then enters the heater 15, before flowing back into the device 12.

Referring now to FIG. 8, the fluid 18 is at a temperature that is greater than the first temperature, but less than the second temperature, such that the rod assembly 142 is partially activated. As such, the wires 144 longitudinally contract, increasing a magnitude of the first force 38 applied to the spool 22 in the first longitudinal direction 76, such that the first force 38 is greater than the second force 52 of the biasing device 26. When partially activated, the pair of wires 144 of the rod assembly 142 act in tension between the end wall 81 of the spool 22 and the first end 30 of the housing 20 to pull the spool 22 in the first longitudinal direction 76 with the first force 38, while the biasing device 26 also acts in the second direction 78 between the spool 22 and the first end 30 of the housing 20 with the second force 52, which is less than, and opposite, the first force 38 applied by the rod assembly 142 in the first longitudinal direction 76. The force imbalance causes the spool 22 to move in the first longitudinal direction 76, until the spool 22 reaches the second position 36 to block the first and second outlets 62.

With continued reference to FIG. 8, in the second position 36, the fluid 18 flows into the first portion 70 of the cavity 28, such that the SMA material 40 of the actuator wires 144 are continuously immersed in the fluid 18. The first section 44 blocks the first and second outlets 62, 64, such that the fluid 18 is prevented from exiting the cavity 28 through outlet 62, 64. Thus, the unnecessary circulation of fluid 18 is prevented.

Referring to FIG. 9, the fluid 18 is at a temperature that is at least equal to the second temperature, such that the pair of wires 144 of the rod assembly 142 are fully activated to act in tension and pull the spool 22 further toward the first end 30. As such, the wires 144 of the rod assembly 142 longitudinally contract even further to increase the magnitude of the first force 38 applied to the spool 22 in the first longitudinal direction 76. Using the two wires 144 also provides double displacement, by virtue of the SMA materials 40 used in each separate wire 144.

With continued reference to FIG. 9, in the third position 37, the fluid 18 flows into the first portion 70 of the cavity 28, such that the SMA material 40 of the actuator wires 144 are continuously immersed in the fluid 18. The first section 44 blocks the first outlet 62, while the fluid 18 flows from the first portion 70 of the cavity 28, through the vent holes 60, and enters the second portion 72 of the cavity 28. The fluid 18 then exits the second portion 72 of the cavity 28 through the second outlet 64, and enters into the third fluid passage 21. The fluid 18 then enters the cooler 14 to be cooled to a lower temperature, before flowing back into the device 12.

Figure 10:
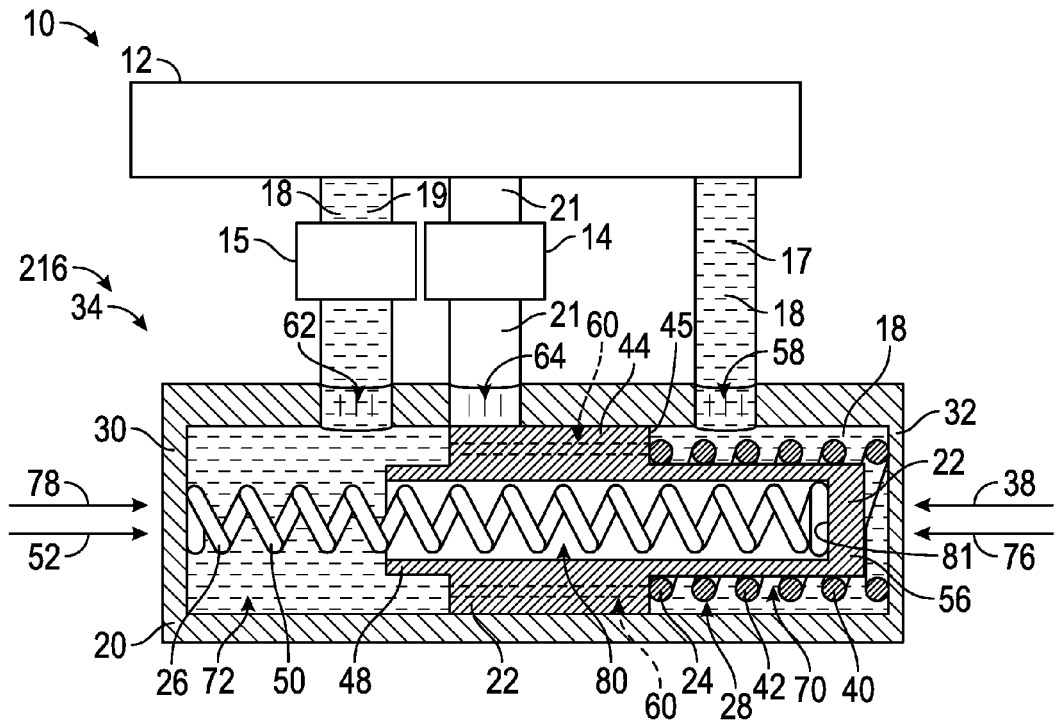
FIG. 10 is a schematic cross-sectional view of a third embodiment of the valve in the fluid circuit, with the valve shown in the first position.
Figure 11:
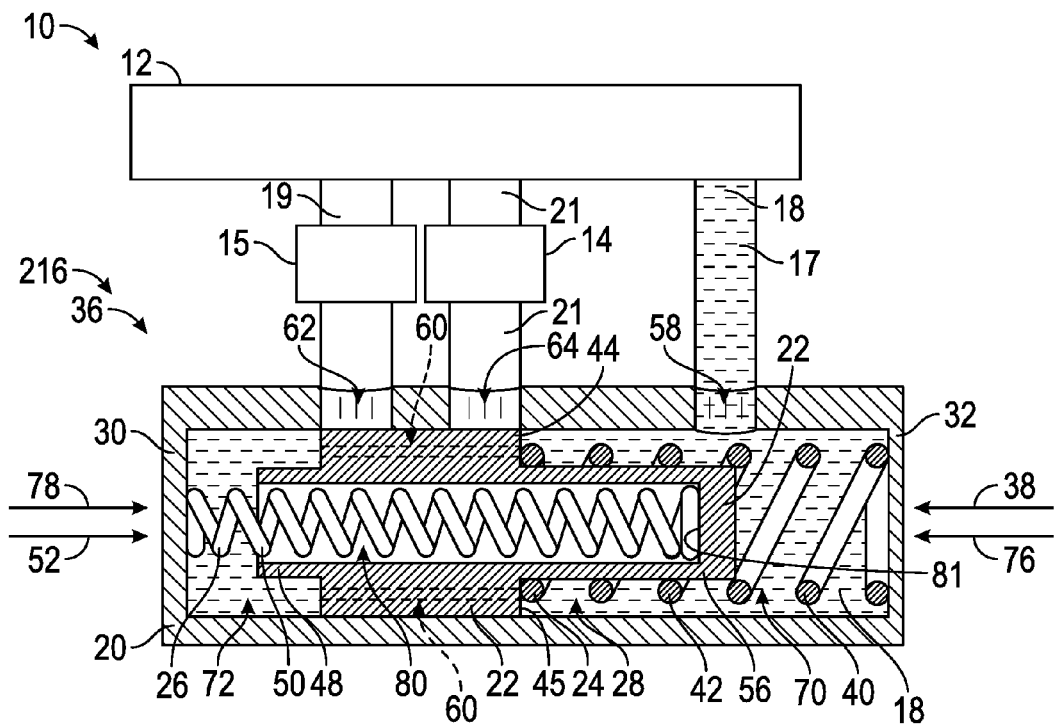
FIG. 11 is a schematic cross-sectional view of the valve of FIG. 10 in the fluid circuit, shown in the second position.
Figure 12:
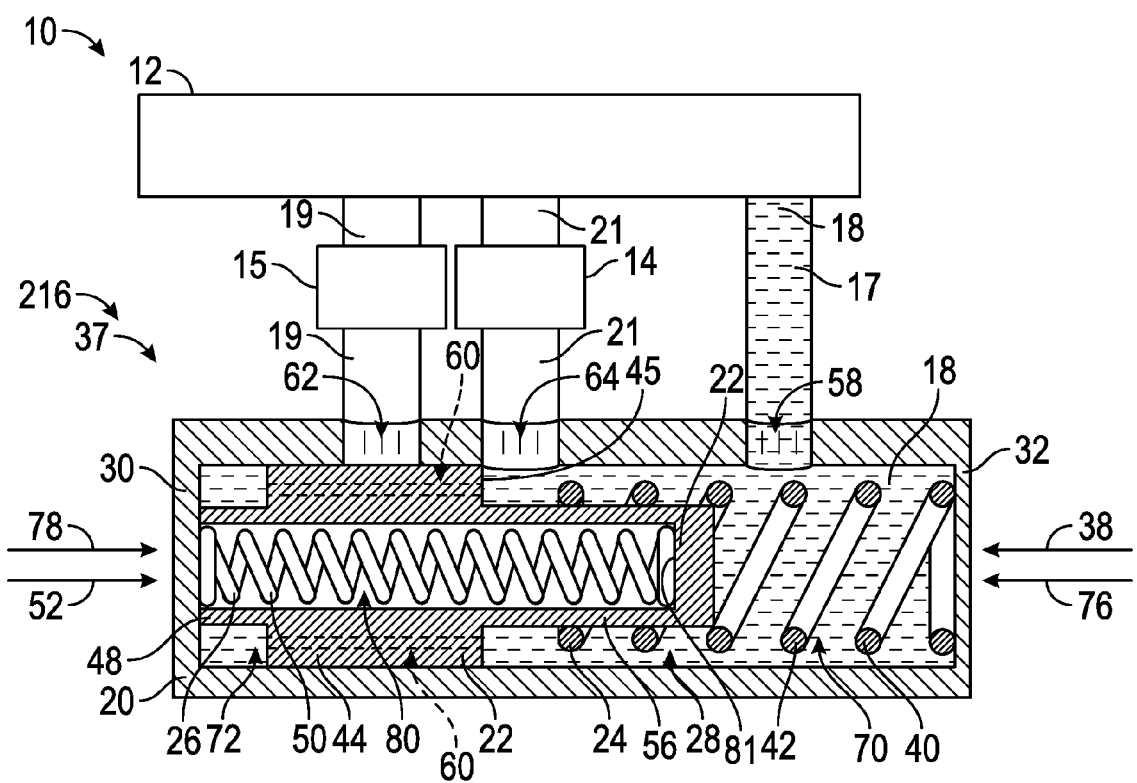
FIG. 12 is a schematic cross-sectional view of the valve of FIG. 10 in the fluid circuit, shown in the third position.

Referring now to FIGS. 10-12, another embodiment of the valve 216 is shown in the first position 34 (FIG. 10), the second position 36 (FIG. 11), and the third position 37 (FIG. 12).

The actuator 24 is a coil spring 42 that includes the SMA material 40. A spool 22 is disposed in the cavity 28 and is movable longitudinally therein between the first position 34 (FIG. 7), the second position 36 (FIG. 8), and the third position 37 (FIG. 9). The coil spring 42 actuator 24 is operatively disposed within the cavity 28, between the second end 32 of the housing 20 and the spool 22, and is configured to act on the spool 22 in the first longitudinal direction 76.

With continued reference to FIGS. 10-12, the spool 22 includes a first section 44, a leading section 48, and a trailing section 56. The leading section 48 and trailing sections 56 longitudinally extend from the first section 44 in opposite directions from one another. The leading section 48 is longitudinally disposed between the first section 44 and the first end 30 of the housing 20. Likewise, the trailing section 56 longitudinally extends from a first wall 45 of the first section 44, such that the trailing section 56 is longitudinally disposed between the first section 44 and the second end 32 of the housing 20. The first section 44 is radially sized to fit within the cavity 28 such that the fluid 18 is prevented from passing within the cavity 28 between the first section 44 and the housing 20. The leading and trailing sections 48, 56 are each radially sized to be smaller than the first section 44 such that the fluid 18 is allowed to flow radially about the leading and trailing sections 48, 56, between the first section 44, the housing 20, and the respective leading and trailing section 48, 56. The coil spring 42 actuator 24 is operatively disposed within the cavity 28 to react between the second end 32 of the housing 20 and the first section 44 of the spool 22. The coil spring 42 is coiled about the trailing section 56, such that the coil spring 42 acts on the first wall 45. Upon activation (i.e., partially or fully), the coil spring 42 is configured to apply a first force 38 to the spool 22, in the first longitudinal direction 76.

The spool 22 defines a recess 80 that opens from the leading section 48 and extends longitudinally therein to an end wall 81. The biasing device 26 may be operatively disposed within the recess 80 to react between the end wall 81 of the spool 22 and the first end 30 of the housing 20. The biasing device 26 may be a compression spring 50. The biasing device 26 is configured to act on the spool 22 with the second force 52 in the second longitudinal direction 78, opposite the first force 38 acting in the first longitudinal direction 76.

With continued reference to FIGS. 10-12, the spool 22 divides the cavity 28 into a first portion 70 and a second portion 72. In this embodiment, the first portion 70 is defined between the first section 44, the trailing section 56, and the housing 20, at the second end 32. The second portion 72 of the cavity 28 is defined between the first section 44, the leading section 48, the housing 20, at the first end 30, opposite the first portion 70. The first section 44 of the spool 22 defines a plurality of vent holes 60 that open between the first portion 70 and the second portion 72 to provide fluid communication between the first portion 70 and the second portion 72 of the cavity 28. Therefore, fluid 18 enters the first portion 70 of the cavity 28 and flows through the vent holes 60, into the second portion 72 of the cavity 28.

The spool 22 is operatively configured such that the first inlet 58 provides fluid communication from the first fluid passage 17 to the first portion 70 of the cavity 28, regardless of the position of the spool 22. The first outlet 62 provides fluid communication from the second portion 72 of the cavity 28 to the second fluid passage 19, and the heater 15, when the spool 22 is in the first position 34 (FIG. 10). The second outlet 64 provides fluid communication from the first portion 70 of the cavity 28 to the third fluid passage 21, when the spool 22 is in the third position 37 (FIG. 12). However, when the spool 22 is in the second position 36, shown in FIG. 11, the first section 44 of the spool 22 blocks the first outlet 62 and the second outlet 64. Thus, fluid 18 may be restricted or prevented from exiting the valve 216 when the spool 22 is in the second position 36.

Referring to FIG. 10, the fluid 18 is at a temperature that is not greater than the first temperature, and the coil spring 42 is deactivated such that the spool 22 is maintained in the first position 34. In the first position 34, the fluid 18 flows through the first inlet 58, and into the first portion 70 of the cavity 28. The fluid 18 then flows through the vent holes 60, and into the second portion 72 of the cavity 28. The fluid 18 then exits the second portion 72 of the cavity 28 through the first outlet 62, and enters the second fluid passage 19, and then the heater 15, where the fluid 18 is heated. The fluid 18 then flows from the heater 15 to the device 12.

Referring now to FIG. 11, the fluid 18 is at a temperature that is greater than the first temperature, but less than the second temperature, such that the coil spring 42 is partially activated. As such, the coil spring 42 longitudinally extends, increasing the magnitude of the first force 38, where the first force 38 is greater than the second force 52 of the biasing device 26. The coil spring 42 acts between the first wall 45 of the spool 22 and the second end 32 of the housing 20, in the first longitudinal direction 76, with the first force 38. At the same time, the biasing device 26 also acts between the end wall of the spool 22 and the first end 30 of the housing 20 in the second longitudinal direction 78, with the second force 52, which is less than, and in opposition to, the first force 38, as applied by the coil spring 42. As such, the spool 22 moves in the first longitudinal direction 76 until the forces 38, 52 are balanced, i.e., the second position 36. In the second position, 36, the first and second outlets 62, 64 are blocked by the first section 44 of the spool 22. Thus, the spool 22 restricts or prevents fluid 18 from exiting the cavity 28 through either outlet 62, 64.

Referring to FIG. 12, the fluid 18 is at a temperature that is at least equal to the second temperature, such that the coil spring 42 is fully activated. As such, the coil spring 42 actuator 24 longitudinally expands even further to further increase the magnitude of the first force 38 applied between the first wall 45 of the spool 22 and the second end 32 of the housing 20. Therefore, the first force 38 is greater than the second force 52 of the biasing device 26 to move the spool 22 even further in the first longitudinal direction 76, until the third position 37 is achieved. In the third position 37, the first section blocks the first outlet 62, and the fluid 18 flows out of the first portion 70 of the cavity 28, through the second outlet 64, and enters the third fluid passage 18. The fluid 18 enters the cooler 14, which cools the fluid 18. The cooled fluid 21 exits the cooler 14 and returns to the device 12.

Figure 13:
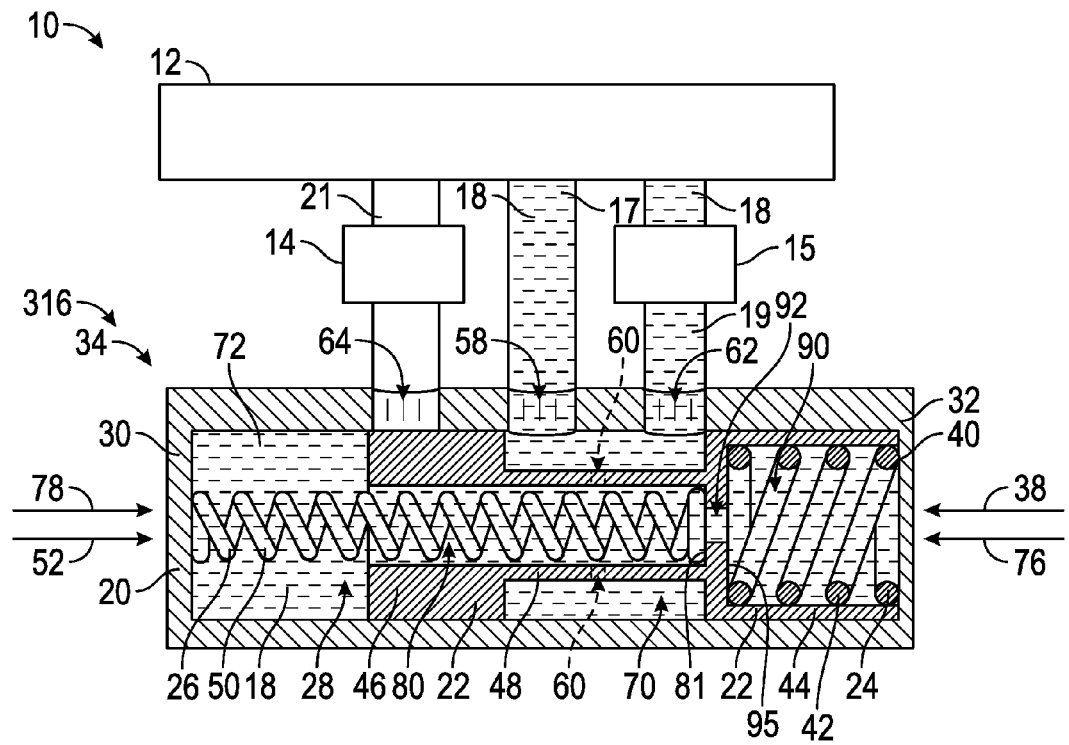
FIG. 13 is a schematic cross-sectional view of a fourth embodiment of the valve in the fluid circuit, with the valve shown in the first position.
Figure 14:
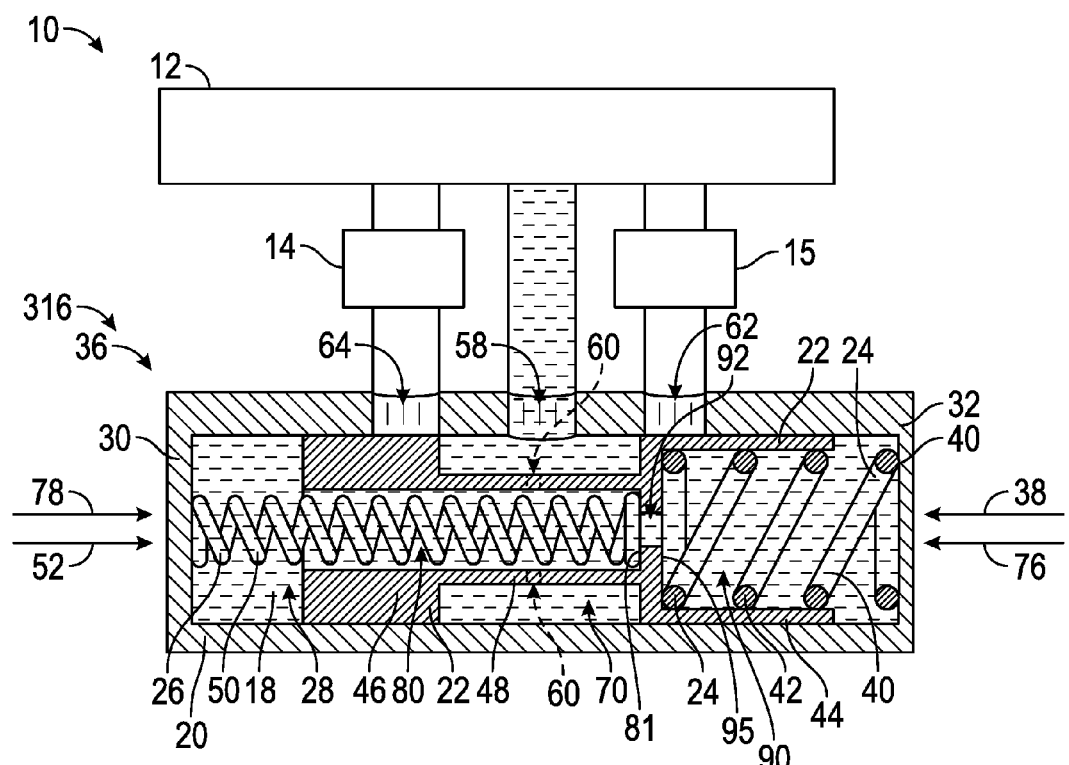
FIG. 14 is a schematic cross-sectional view of the valve of FIG. 13 in the fluid circuit, shown in the second position.
Figure 15:
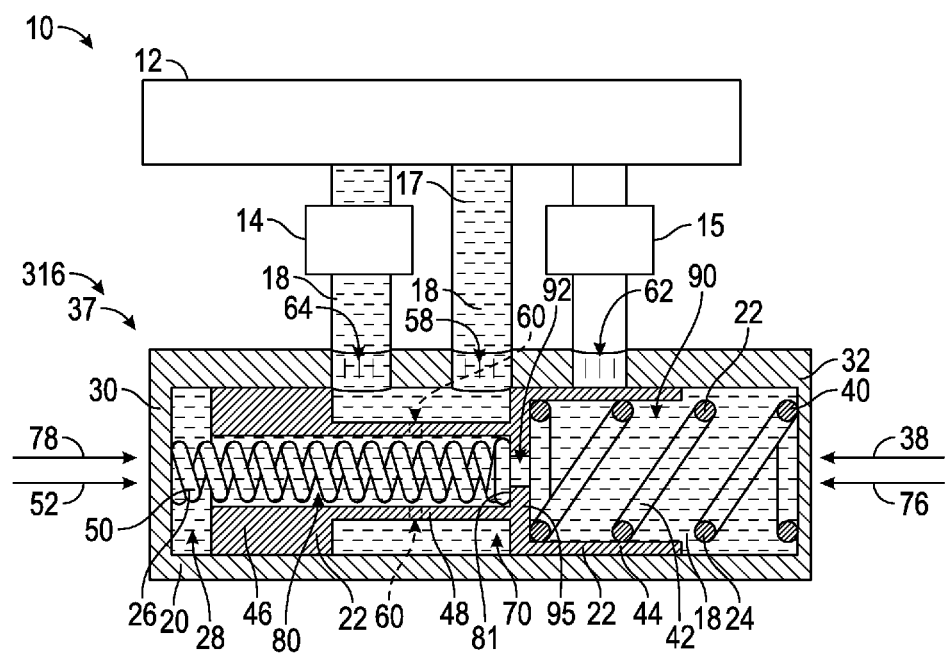
FIG. 15 is a schematic cross-sectional view of the valve of FIG. 13 in the fluid circuit, shown in the third position.

Referring now to FIGS. 13-15, yet another embodiment of the valve 316 is shown. The spool 22 is disposed in the cavity 28 and is movable longitudinally therein between the first position 34 (FIG. 13), the second position 36 (FIG. 14), and the third position 37 (FIG. 15).

The actuator 24 may be a coil spring 42 that includes the SMA material 40. The coil spring 42 actuator 24 is operatively disposed within the cavity 28, between the second end 32 of the housing 20 and the spool 22, and is configured to act on the spool 22 in the first longitudinal direction 76. The spool 22 includes a first section 44, a second section 46, and a leading section 48. The first section 44 is longitudinally spaced from the second section 46, such that the leading section 48 is longitudinally disposed between the first section 44 and the second section 46. The leading section 48 functions as an intermediate section to connect the first section 44 to the second section 46. The first section 44 and the second section 46 are radially sized to fit within the cavity 28 such that the fluid 18 is prevented from passing within the cavity 28 between the first section 44 or the second section 46 and the housing 20. The leading section 48 is radially sized to be smaller than the first section 44 and second section 46 such that the fluid 18 is allowed to flow radially about the leading section 48, between the leading section 48, the first section 44, the second section 46, and the housing 20.

The spool 22 may define a first recess 80 that opens from the second section 46 and extends into the leading section 48, and terminates at an end wall 81. The first section 44 defines a second recess 90 that longitudinally extends to a base wall 95. The spool defines an aperture 92 extending between the end wall 81 and the base wall 95. As such, the aperture 92 provides fluid communication between the first recess 80 the second recess 90.

The coil spring 42 is operatively disposed in the cavity 28 between the first section 44, opposite the leading section 48, and the housing 20. The coil spring 42 is configured to act on the first section 44 and apply the first force 38 in the first longitudinal direction 76.

The biasing device 26 is operatively disposed in the cavity 28 and configured to act on the spool 22 with the second force 52 in the second longitudinal direction 78, opposite the first force 38 acting in the first longitudinal direction 76. More specifically, the biasing device 26 is partially operatively disposed within the first recess 80 to react between the end wall 81 of the spool 22 and the first end 30 of the housing 20, and apply a second force 52 to the spool 22 in the second longitudinal direction 78, opposite the first longitudinal direction 76.

The coil spring 42 actuator 24 may be similarly disposed within the second recess 90 to react between the base wall 95 of the spool 22 and the second end 32 of the housing 20 to apply the first force 38 in the first longitudinal direction 76. Recessing a portion of the biasing device 26 within the first recess 80 and a portion of the coil spring 42 within the second recess 90 provides a valve 316 that is compact in size, without sacrificing a desired amount of travel of the spool 22 within the cavity 28.

The spool 22 is operatively disposed in the cavity to divide the cavity into a first portion 70 and a second portion 72. The first portion 70 of the cavity 28 is defined between the first section 44, the second section 46, the leading section 48, and the housing 20. The leading section 48 of the spool 22 defines a plurality of vent holes 60 that open to provide fluid communication between the first portion 70 and the first recess 80. Therefore, fluid 18 enters the first portion 70 of the cavity 28 and flows through the vent holes 60, and into the first recess 80. The fluid 18 then flows from the first recess 80, through the aperture 92, into the second recess 90, and into the second portion 72 of the cavity 28, as illustrated in FIGS. 13-15. This allows the actuator 24, including the SMA material 40, to be totally immersed in the flowing fluid 18 such that the temperature is even across the whole actuator 24 and is always equal to the temperature of the fluid 18. As such, the SMA material 40 of the coil spring 42 actuator 24 remains in continuous fluid communication with the fluid 18 received from the device 12.

The spool 22 is operatively configured such that the first inlet 58 provides fluid communication from the first fluid passage 17 to the first portion 70 of the cavity 28, regardless of the position of the spool 22. With reference to FIG. 13, when the spool 22 is in the first position 34, the second section 46 of the spool 22 blocks the second outlet 64, and fluid 18 flows from the first portion 70 of the cavity 28, through the first outlet 62, and into the second fluid passage 19. With reference to FIG. 15, when the spool 22 is in the third position 37, the first section 44 of the spool 22 blocks the first outlet 62, and fluid 18 flows from the first portion 70 of the cavity 28, through the second outlet 64, and into the third fluid passage 21. However, when the spool 22 is in the second position 36, shown in FIG. 14, the first section 44 of the spool 22 blocks the first outlet 62 and the second section 46 of the spool 22 blocks the second outlet 64. Thus, fluid 18 is restricted or prevented from exiting the valve 316 when the spool 22 is in the second position 36.

Referring again to FIG. 13, the fluid 18 is at a temperature that is not greater than the first temperature, and the coil spring 42 actuator 24 is deactivated, such that the coil spring 42 is longitudinally contracted. The contracted coil spring 42 acts on the end wall 81 within the first section 44 of the spool 22 in the first longitudinal direction 76 with a first force 38, while the biasing device 26 acts on the end wall 81 within the leading section 48 in the second longitudinal direction 78, opposite the first longitudinal direction 76, with a second force 52, which is not less than the first force 38 of the coil spring 42. Thus, the spool 22 is maintained in the first position 34.

Referring again to FIG. 14, the fluid 18 is at a temperature that is greater than the first temperature, but less than the second temperature, such that the coil spring 42 is partially activated. As such, the coil spring 42 longitudinally expands, increasing the magnitude of the first force 38 such that the first force 38 is greater than the second force 52 of the biasing device 26. The coil spring 42 acts on the base wall 95 of the first section 44 of the spool 22 in the first longitudinal direction 76 with the first force 38 while the biasing device 26 acts on the base wall 95 of the second section 46 with the second force 52, which is less than the first force 38 of the coil spring 42, to move the spool 22 in the first longitudinal direction 76 until the first and second forces 38, 52 offset from one another to maintain the spool 22 in the second position 36. In the second position 36, the first and second outlets 62, 64 are blocked by the spool 22. Thus, fluid 18 is restricted or prevented from exiting the cavity 28 through either outlet 62, 64.

Referring again to FIG. 15, the fluid 18 is at a temperature that is at least equal to the second temperature, such that the coil spring 42 is fully activated. As such, the coil spring 42 longitudinally expands even further to further increase the magnitude of the first force 38. Therefore, the first force 38 is once again greater than the second force 52 of the biasing device 26 and moves the spool 22 even further in the first longitudinal direction 76 to the third position 37. In the third position 37, the fluid 18 flows out of the first portion 70 of the cavity 28, through the second outlet 64, and enters the third fluid passage 21 and the cooler 14. The fluid 18 exits the cooler 14 and eventually enters the device 12.

Additionally, with respect to the embodiment shown in FIGS. 13-15, the coil spring 42 type of actuator 24 may be replaced with the tube assembly 142 type of actuator 24 having two or more SMA wires cooperatively connected to increase stroke, given an overall length, as described with respect to the embodiment shown in FIGS. 7-9.

It should also be appreciated that with respect the second position 36 of each of the valves 16, 116, 216, 316 may be configured to not completely block all fluid 18 from exiting the cavity 27 through the first and/or second outlets 62, 64. Instead, in the second position, the spool 22 may be positioned to allow a reduced amount of fluid 18 to exit through the first and/or second outlets 62, 64. As yet another alternative, in the second position 36, the housing 20 of the valve 16, 116, 216, 316 may define an additional outlet that bypasses the heater 15, and the cooler 14 and returns the fluid 18 directly to the device 12.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims.

The invention claimed is:

1. A valve configured for directing the flow of fluid received from a device to one of a heater and a cooler, within a fluid circuit, as a function of a temperature of the fluid, the valve including:
    a housing defining a cavity extending longitudinally between a first end and a second end, wherein the cavity is configured for receiving and expelling the fluid;
    a spool disposed in the cavity and movable longitudinally therein between a first position, a second position, and a third position;
    an actuator operatively disposed within the cavity and configured to be in continuous fluid communication with the fluid received from the device;
    wherein the actuator includes a smart material configured to be deactivated in response to the temperature of the fluid being no greater than a first temperature, such that the smart material deactivates the actuator;
    wherein the smart material is configured to be fully activated in response to the temperature of the fluid being at least equal to a second temperature, such that full activation of the smart material causes the actuator to be fully activated;
    wherein the smart material is configured to be partially activated in response to the temperature of the fluid being greater than the first temperature and less than the second temperature, such that the smart material causes the actuator to be partially activated;
    wherein the actuator is configured to continuously act on the spool when the actuator is partially activated, such that the spool moves to the second position;
    wherein the actuator is configured to continuously act on the spool when the actuator is fully activated, such that the spool moves to the third position;
    wherein the fluid is permitted to flow from the cavity to the heater, and from the heater to the device when the spool is in the first position;
    wherein the fluid is prevented from flowing to the heater and the cooler when the spool is in the second position; and
    wherein the fluid is permitted to flow from the cavity to the cooler, and from the cooler to the device when the spool is in the third position.

2. The valve, a set forth in claim 1, wherein valve further includes a biasing device;
    wherein the actuator acts on the spool in a first longitudinal direction and the biasing device acts on the spool in a second longitudinal direction, opposite the first longitudinal direction, when the actuator is partially activated, such that the actuator acts on the spool to overcome the biasing device to move the spool to the second position;
    wherein the actuator acts on the spool in the first longitudinal direction when fully activated, such that the actuator acts on the spool to overcome the biasing device to move the spool to the third position; and
    wherein the biasing device acts on the spool in the second longitudinal direction, when the actuator is deactivated, such that the biasing device acts on the spool to overcome the actuator to move the spool to the first position.

3. The valve, as set forth in claim 2, wherein the spool defines a first recess extending to an end wall, such that the first recess is in facing relationship to the first end of the housing; and
    wherein a portion of the biasing device is disposed in the first recess, such that the biasing device is operatively disposed to react between the end wall of the spool and the first end of the housing.

4. The valve, as set forth in claim 3, wherein the housing defines an inlet, a first outlet, and a second outlet;
    wherein the inlet is configured to provide fluid communication between the device and the cavity;
    wherein the first outlet is configured to provide fluid communication between the cavity and the heater;
    wherein the second outlet is configured to provide fluid communication between the cavity and the cooler;
    wherein the spool divides the cavity into a first portion and a second portion, such that the first portion is configured for receiving fluid directly from the device; and
    wherein the second portion is configured for receiving the fluid from the first portion, as a function of the temperature of the fluid.

5. The valve, as set forth in claim 4, wherein the spool includes a first section and a leading section, longitudinally extending from the first section, such that the leading section is operatively disposed in the cavity between the first section and the first end of the housing;
    wherein the first section is radially sized to fit within the cavity such that fluid is prevented from passing within the cavity between the first section and the housing; and
    wherein the leading section is radially sized to be smaller than the first section, such that the fluid is allowed to flow radially about the leading section.

6. The valve, as set forth in claim 5, wherein the spool further includes a trailing section, longitudinally extending from the first section, opposite the leading section, such that the trailing section is operatively disposed in the cavity between the first section and the second end of the housing; and
    wherein the trailing section is radially sized to fit within the cavity such that fluid is allowed to flow radially about the trailing section.

7. The valve, as set forth in claim 5, wherein the actuator is operatively disposed in the cavity and configured to react between the first section of the spool and the second end of the housing.

8. The valve, as set forth in claim 6, wherein the actuator is a coil spring; and
    wherein a portion of the coil spring radially surrounds the trailing section of the spool.

9. The valve, as set forth in claim 5, wherein the spool further includes a second section, longitudinally extending from the leading section, such that the second section is operatively disposed in the cavity between the leading section and the first end of the housing;
  wherein the second section is radially sized to fit within the cavity, such that fluid is prevented from passing within the cavity between the second section and the housing; and
  wherein the leading section is radially sized to be smaller than the first section and the second section, such that the fluid is allowed to flow radially about the leading section, between the first section, the second section, and the housing.

10. The valve, as set forth in claim 9, wherein the first outlet is longitudinally defined proximate the second end of the housing;
  wherein the second outlet is longitudinally defined proximate the first end of the housing;
  wherein inlet is longitudinally defined between the first outlet and the second outlet;
  wherein the spool defines at least one vent hole configured to provide fluid communication from the first portion of the cavity to the second portion of the cavity;
  wherein the first portion of the cavity is defined between the first section, the second section, and the housing;
  wherein the second section of the spool is configured to block the second outlet and allow the fluid to flow from the first portion of the cavity, through the first outlet, when the spool is in the first position;
  wherein the first section of the spool is configured to block the second outlet and the second section is configured to block the first outlet, such that the fluid is restricted from exiting the cavity through each of the first outlet and the second outlet, when the spool is in the second position; and
  wherein the first section of the spool is configured to block the first outlet and allow the fluid to flow from the first portion of the cavity, through the at least one vent hole, to the second portion of the cavity, and from the second portion of the cavity, through the second outlet, when the spool is in the third position.

11. The valve, as set forth in claim 10, wherein the first section defines a second recess extending longitudinally to a base wall; and
  wherein a portion of the actuator is disposed in the second recess, such that the biasing device is operatively disposed to react between the base wall of the spool and the second end of the housing.

12. The valve, as set forth in claim 11, wherein the spool defines at least one opening extending between the end wall and the base wall, such that the at least one opening is configured to provide fluid communication between the first portion of the cavity and the second portion of the cavity.

13. The valve, as set forth in claim 5, wherein the inlet is defined longitudinally proximate the second end of the housing, such that the inlet provides continuous fluid communication to the first portion of the cavity;
  wherein the first outlet is defined longitudinally proximate the first end of the housing;
  wherein the second outlet is defined longitudinally between the inlet and the first outlet;
  wherein the spool defines at least one vent hole configured to provide fluid communication from the first portion of the cavity to the second portion of the cavity;
  wherein the first section of the spool is configured to block the second outlet and allow the fluid to flow from the first portion of the cavity, through the at least one vent hole, to the second portion of the cavity, and from the second portion of the cavity, through the first outlet, when the spool is in the first position;
  wherein the first section of the spool is configured to block each of the first outlet and the second outlet, such that the fluid is restricted from exiting the cavity through each of the first outlet and the second outlet, when the spool is in the second position; and
  wherein the first section of the spool is configured to block the first outlet and allow the fluid to flow from the first portion of the cavity, through the second outlet, when the spool is in the third position.

14. The valve, as set forth in claim 5, wherein the inlet is defined longitudinally proximate the second end of the housing, such that the inlet provides continuous fluid communication to the first portion of the cavity;
  wherein the second outlet is defined longitudinally proximate the first end of the housing;
  wherein the first outlet is defined longitudinally between the inlet and the first outlet;
  wherein the spool defines at least one vent hole configured to provide fluid communication from the first portion of the cavity to the second portion of the cavity;
  wherein the second section of the spool is configured to block fluid flow through the second outlet and allow the fluid to flow from the first portion of the cavity, through the at least one vent hole, to the second portion of the cavity, and from the second portion of the cavity, through the first outlet, when the spool is in the first position;
  wherein the first section of the spool is configured to block the first outlet and the second section of the spool is configured to block the second outlet, such that the fluid is restricted from exiting the cavity through each of the first outlet and the second outlet, when the spool is in the second position; and
  wherein the first section of the spool is configured to block the first outlet and allow the fluid to flow from the first portion of the cavity, through the second outlet, when the spool is in the third position.

15. The valve, as set forth in claim 5, wherein the inlet is defined longitudinally proximate the first end of the housing, such that the inlet provides continuously fluid communication to the first portion of the cavity;
  wherein the second outlet is defined longitudinally proximate the second end of the housing;
  wherein the first outlet is defined longitudinally between the inlet and the second outlet;
  wherein the spool defines at least one vent hole configured to provide fluid communication from the first portion of the cavity to the second portion of the cavity;
  wherein the first section of the spool is configured to block the second outlet and allow the fluid to flow from the first portion of the cavity, through the first outlet, when the spool is in the first position;
  wherein the first section of the spool is configured to block each of the first outlet and the second outlet, such that the fluid is restricted from exiting the cavity through each of the first outlet and the second outlet, when the spool is in the second position; and
  wherein the spool is configured to block the first outlet and allow the fluid to flow from the first portion of the cavity, through the at least one vent hole, to the second portion of the cavity, and from the second portion of the cavity, through the second outlet, when the spool is in the third position.

16. The valve, as set forth in claim 15, wherein the actuator is operatively disposed between the spool and the first end of the housing.

17. The valve, as set forth in claim 16, wherein the actuator is operatively secured to each of the first end of the housing and the end wall of the spool, such that the actuator is operatively disposed in the first portion of the cavity;
wherein the actuator includes at least one wire comprising the SMA material; and
wherein the at least one wire is configured to longitudinally contract when the actuator is partially activated and the actuator is fully activated.

18. The valve, as set forth in claim 17, wherein the biasing device is a coil spring; and
wherein the coil spring radially surrounds the actuator device.

19. The valve, as set forth in claim 17, wherein the actuator is a rod assembly including a rod and the at least one wire is a pair of wires operatively extending from opposing ends of the rod; and
wherein one of the pair of wires is operatively secured to the first end of the housing and the other of the pair of wires is operatively secured to the end wall of the spool.

20. A fluid circuit configured for regulating the flow of a fluid, the fluid circuit comprising:
a device configured for receiving and expelling the fluid;
a heater configured for receiving, heating, and expelling the fluid to the device;
a cooler configured for receiving, cooling, and expelling the fluid to the device; and
a valve configured for directing the flow of fluid received from the device to one of the heater and the cooler, as a function of a temperature of the fluid, the valve including:
a housing defining a cavity extending longitudinally between a first end and a second end, wherein the cavity is configured for receiving and expelling the fluid;
a spool disposed in the cavity and movable longitudinally therein between a first position, a second position, and a third position;
an actuator operatively disposed within the cavity and configured to be in continuous fluid communication with the fluid received from the device;
wherein the actuator includes a smart material configured to be deactivated in response to the temperature of the fluid being no greater than a first temperature, such that the smart material deactivates the actuator;
wherein the smart material is configured to be fully activated in response to the temperature of the fluid being at least equal to a second temperature, such that full activation of the smart material causes the actuator to be fully activated;
wherein the smart material is configured to be partially activated in response to the temperature of the fluid being greater than the first temperature and less than the second temperature, such that the smart material causes the actuator to be partially activated;
wherein the actuator is configured to continuously act on the spool when the actuator is partially activated, such that the spool moves to the second position;
wherein the actuator is configured to continuously act on the spool when the actuator is fully activated, such that the spool moves to the third position;
wherein the fluid is permitted to flow from the cavity to the heater, and from the heater to the device when the spool is in the first position;
wherein the fluid is prevented from flowing to the heater and the cooler when the spool is in the second position; and
wherein the fluid is permitted to flow from the cavity to the cooler, and from the cooler to the device when the spool is in the third position.

* * * * *